United States Patent [19]

Witte

[11] Patent Number: 5,067,355

[45] Date of Patent: Nov. 26, 1991

[54] SHAFT TORQUE MEASUREMENT

[75] Inventor: James R. Witte, Cincinnati, Ohio

[73] Assignee: General Electric Company, Cincinnati, Ohio

[21] Appl. No.: 552,393

[22] Filed: Jul. 13, 1990

[51] Int. Cl.$^5$ ............................................. G01L 3/10
[52] U.S. Cl. ................................. 73/862.34; 73/117.3
[58] Field of Search ................ 73/862.34, 117.2, 117.3

[56] References Cited

U.S. PATENT DOCUMENTS

| 3,538,762 | 11/1970 | Parkinson et al. | |
| 3,548,649 | 12/1970 | Parkinson | |
| 4,444,064 | 4/1984 | Wolfinger | 73/862.34 |
| 4,774,845 | 10/1988 | Barbe et al. | 73/862.34 |
| 4,875,379 | 10/1989 | Rohs et al. | 73/862.34 |

Primary Examiner—Charles A. Ruehl
Attorney, Agent, or Firm—Jerome C. Squillaro

[57] ABSTRACT

A method and apparatus for determining the power output of a gas turbine engine utilizes a speed sensor coupled to the engine shaft and a signal developed by a pyrometer coupled to the engine turbine for determining engine temperature. The speed sensor is normally provided in the engine for determining shaft speed and is part of the control system for the engine. The pyrometer is provided also as part of the control system to monitor gas turbine temperatures. A signal from the speed sensor derived from a toothed wheel passing adjacent the sensor is processed to obtain a train of pulse signals representative of angular rotation of the engine shaft. The pyrometer is mounted adjacent at least one of the turbine disks of the engine for detecting instantaneous temperature of each blade of the turbine disk as it passes by the pyrometer. The signal developed by the pyrometer is therefore a signal having peaks corresponding to passage of each blade at the pyrometer. A signal conditioning apparatus processes the signal from the pyrometer to develop a pulse train of shaped signals corresponding to the angular position of each turbine blade as it passes by the pyrometer. The system determines the relative phase difference between the signals developed by the speed sensor and the signals developed on the pyrometer under low load conditions and stores this information as a reference phase difference value. Phase differences under load conditions are thereafter compared to the reference value. The differences in phase are proportional to shaft twist and accordingly to shaft torque.

6 Claims, 1 Drawing Sheet

SHAFT TORQUE MEASUREMENT

The present invention relates to gas turbine engines and, more particularly, to a torque measuring method and apparatus for determining the power output of a gas turbine engine.

BACKGROUND OF THE INVENTION

It is generally desirable to know the power output of a gas turbine engine. It is known that such power output can be determined by measuring the torque developed by a shaft extending through the engine on which the various components of the engine, such as, for example, the compressor blades and turbine blades, are mounted. Torque can be determined by measuring the twist or angular deflection of the engine shaft between an air inlet or forward end of the engine and an exhaust end. In the past, it has been known to attach shaft angular position sensors to each end of the shaft and to measure the twist or angular deflection of the torque using these assemblies. The shaft position sensors are generally expensive and have become increasingly more difficult to utilize as the size of gas turbine engines has increased. It is therefore desirable to provide a method and apparatus for determining the torque developed by a gas turbine engine and its corresponding power output without the expense of shaft position sensors.

SUMMARY OF THE INVENTION

It is an object of the present invention to provide a method and apparatus for determining power output of a gas turbine engine without the use of position sensors.

It is still another object of the present invention to provide a method for determining power output of a gas turbine engine without having to add additional sensing equipment to the engine.

The above and other objects of the present invention are achieved in a method and apparatus for determining the power output of a gas turbine engine utilizing a speed sensor coupled to the engine shaft and a signal developed by a pyrometer coupled to the engine turbine for determining engine temperature. The speed sensor is normally provided in the engine for determining shaft speed and is part of the control system for the engine. The pyrometer is provided also as part of the control system to monitor gas turbine temperatures. In the practice of the present invention, a signal from the speed sensor derived from a toothed wheel passing adjacent the sensor is processed to obtain a train of pulse signals representative of angular rotation of the engine shaft. The pyrometer is mounted adjacent at least one of the turbine disks of the engine for detecting instantaneous temperature of each blade of the turbine disk as it passes by the pyrometer. The signal developed by the pyrometer is therefore a signal having peaks corresponding to passage of each blade at the pyrometer. A signal conditioning apparatus processes the signal from the pyrometer to develop a pulse train of shaped signals corresponding to the angular position of each turbine blade as it passes by the pyrometer. The system determines the relative phase difference between the signals developed by the speed sensor and the signals developed on the pyrometer under low load conditions and stores this information as a reference phase difference value. Under load conditions, any twist in the engine shaft will result in an additional phase displacement between the signals from the speed sensor and those from the pyrometer and this phase difference can be compared to the initial stored phase difference to determine the amount of twist in the engine shaft. The degree of twist is directly proportional to the torque developed by the engine shaft. The torque developed by the engine shaft is directly proportional to engine horsepower output. Accordingly, the present invention provides a method and apparatus for determining engine power utilizing existing hardware and signals developed in the engine from a speed sensor and a pyrometer and obviates the need for adding additional hardware to detect shaft angular position.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
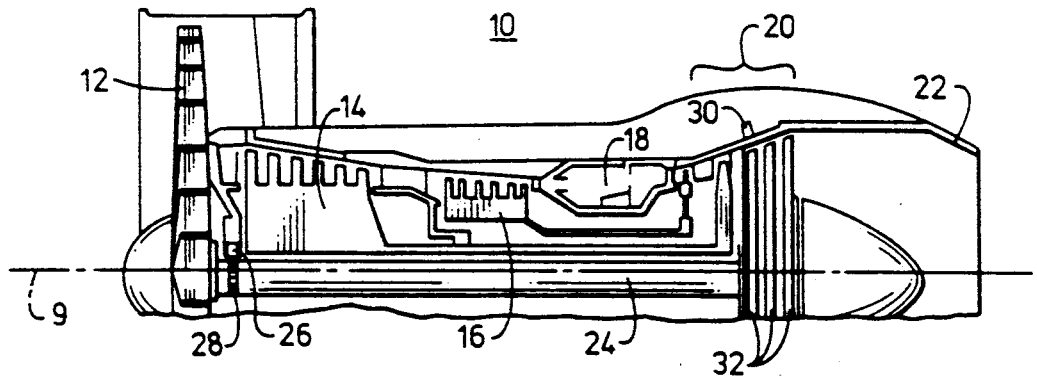
FIG. 1 is a simplified cross-sectional view of an exemplary gas turbine engine illustrating the location of the speed sensor and pyrometer with respect to the engine shaft.

FIG. 1 is a simplified, partial cross-sectional view of a ducted fan gas turbine engine 10 with which the present invention may be used. The engine 10 is essentially identical in its upper and lower halves so only the upper half substantially above centerline 9 is shown. The engine 10 includes a ducted fan 12, intermediate and high pressure compressor sections 14 and 16, respectively, a combustion chamber 18, a turbine stage 20, and an exhaust nozzle 22. The turbine stage 20 may be divided into high, low, and intermediate sections for providing power to the fan 12 and compressor sections 14 and 16 through corresponding elements of a central shaft 24. Air compressed by fan 12 and the compressor sections 14 and 16 is mixed with fuel and combusted in combustion chamber 18. The combustion products expand through this turbine stage 20 and are exhausted through nozzle 22. Propulsive thrust is provided by air moved outside the engine by the fan 12 coupled with some thrust provided by exhaust from the nozzle 22.

Near the forward end of the engine 10, there is generally positioned a speed sensor 26 which is mounted adjacent a toothed wheel 28 on the shaft 24. The speed sensor 26 provides output signals indicative of the rotational speed of the shaft 24. The speed signal is generally utilized by the engine control system (not shown) for preventing overspeed conditions and for controlling fuel flow to the engine in a manner well known in the art. The engine 10 also typically includes a pyrometer 30 mounted adjacent at least one of the multi-blade turbine disks 32 in the turbine stage 20. The pyrometer is typically an optical pyrometer which provides an amplitude modulated signal indicative of the temperature of each of the turbine blades of the at least one of the disks 32 as each blade passes by the pyrometer. The optical pyrometer output signal is amplitude modulated since it varies with peaks coinciding with the close proximity of each of the turbine blades to the pyrometer, i.e., the output signal has its highest value when the blades are at their closest point to the pyrometer and its lowest value at about a mid-blade position as the blades rotate pass the pyrometer.

Applicants have found that the signals developed by the speed sensor 26 and the optical pyrometer 30 constitute signals representative of the angular position of the shaft 24 at two different locations. By use of pulse shaping techniques, Applicants can derive from the speed sensor signal and the pyrometer signal, first and second sets of pulse trains which can be utilized to determine the angular position of points on the engine shaft. In particular, the toothed wheel 28 has a plurality of teeth that are circumferentially and uniformly spaced about the engine shaft 24 near the forward or inlet end of the engine. The turbine blades are also circumferentially and uniformly spaced about the turbine shaft near the exhaust end of the engine. In order to use these two sets of pulse train signals to indicate shaft torque, it is only necessary to establish the phase relationship between the two signals at some preselected low torque value such as might occur at engine start-up. Thereafter, as the engine is brought up to loaded condition, the phase difference between the two signals can be determined and compared to the original phase difference to obtain the degree of twist in the engine shaft. Since twist is directly proportional to torque, the phase shift as the engine is brought to the loaded condition becomes directly proportional to engine torque. Furthermore, engine torque is directly proportional to power output of the engine. The conversion from torque to power output may be made using standard conversion techniques well known in the art.

Figure 2:
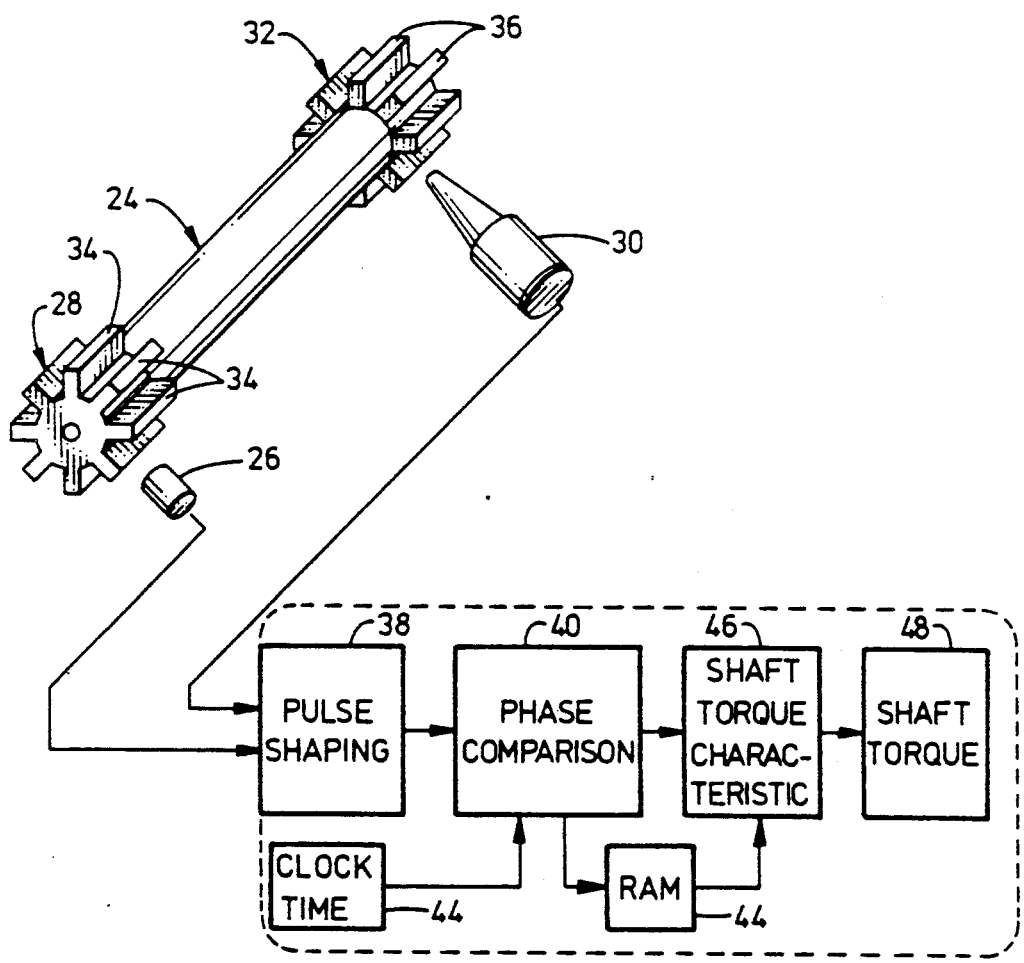
FIG. 2 is a simplified schematic representation of the speed sensor and pyrometer generating signals for application to an electronic system for obtaining torque power output from the signals.

Referring now to FIG. 2, there is shown a simplified schematic representation of one system for developing engine torque output information utilizing the aforementioned speed sensor 26 and pyrometer 30. The speed sensor 26 is mounted adjacent a toothed wheel 28 fixedly attached to the shaft 24 so that the speed sensor provides a sequence of pulses or an amplitude modulated signal corresponding to passage of each tooth 34 of the wheel 28 pass the sensor 26. At another end of the shaft 24, the turbine blades 36 (indicated schematically as gear teeth) pass by the optical sensor 30 so that the optical sensor 30 provides an amplitude modulated signal corresponding to the temperature of the blades as they pass by the pyrometer. Since the blades 36 are being monitored for temperature, the signal from the pyrometer 30 has peaks corresponding to passage of each blade into the pyrometer field of view. The signal from the pyrometer 30 and the signal from the speed sensor 26 are both applied to pulse shaping circuit 38 suitable for converting the signals to pulse trains in which the leading edge of each pulse corresponds to either one of the teeth 34 on the toothed wheel 28 or one of the blades 36 on the turbine disk 32. The pulse shaping circuit 38 may be of any suitable type well known in the art such as, for example, a Schmitt trigger circuit. Although shown as a single block, it will be understood that the pulse shaping circuit 38 may be two separate circuits for developing two separate pulse trains. A first pulse train representative of signals from the speed sensor 26 and a second pulse train representative of signals from the optical pyrometer 30 are coupled to a phase comparison block 40 in which the difference in phase between individual pulses of each pulse train is determined. While any number of teeth may be utilized on the speed sensor wheel 28, phase comparison may be simplified by providing a toothed or notched wheel 28 which has the same number of teeth or notches as the number of blades 36 in the at least one turbine disk 32 or at least an integral multiple of those number of blades. The phase comparison also requires a time signal which may be supplied to the phase comparison circuit 40 from a clock oscillator 42 of a type well known in the art. Once the difference in phase between the first and second pulse trains has been determined at a low load condition, this value may be stored in a memory circuit 44 for use in comparison with other phase differences at other load conditions. When the engine is brought up to a preselected load condition, the phase difference between the first and second pulse trains is also determined by the phase comparison circuit 40 and compared with the phase difference determined under the low load conditions as stored in memory circuit 44. The shaft torque characteristic block 46 provides the phase difference determination from the comparison of the phase difference at the two different load conditions. This phase difference information is then supplied to the block 48 which converts the phase difference to shaft torque. The phase difference will be appreciated to be directly proportional to the amount of twist in the engine shaft 24, which twist is directly proportional to the torque placed on the shaft by the turbine blades 32. The shaft torque is further proportional to the power output of the engine. Accordingly, the apparatus of FIG. 2 provides a method for determining engine power output utilizing existing apparatus incorporated in the engine for the purpose of obtaining other measurable quantities. The method as set forth above determines the power output of the gas turbine engine 10 utilizing the speed sensor 26 mounted near the compressor sections 14 and 16 and the pyrometer 30 mounted adjacent at least one of the multiple blade turbine disk 32. The engine shaft 24 is rotated under relatively low load conditions and a first set of signals from the speed sensor 26 corresponding to the angular rotation of the shaft 24 is obtained. A second set of signals from pyrometer 30 representing the temperature of each blade of at least one of the turbine disks 32 as each blade passes a predetermined point adjacent the pyrometer is also obtained. Both the first and second sets of signals are conditioned by the pulse shaping circuit 38 to develop corresponding first and second sets of pulse signals in which each pulse signal in the first set of pulse signals has a determinable first phase relationship to each pulse signal in the second set of pulse signals. The engine is then operated under at least another relatively higher load condition and another first and second set of signals are obtained. After conditioning, another first and second sets of signals are in the form of corresponding sets of pulse signals which can be compared to determine another phase relationship. The first phase relationship and the another phase relationship are then compared to obtain a phase difference or phase change attributable to twist in the shaft 24. The shaft torque characteristic circuit then converts the shaft twist to a corresponding torque value to determine the power output of the engine from predetermined relationships between torque and power.

While the invention has been described in what is presently considered to be a preferred embodiment, other modifications and variations will become apparent to those skilled in the art. It is intended therefore that the invention not be limited to specific embodiment shown but be interpreted within the spirit and scope of the appended claims.

What is claimed is:

1. A method of determining the power output of a gas turbine engine having a compressor coupled therewith, the engine including a power shaft, at least one multiple blade turbine disk coupled to the shaft, a speed sensor, and a pyrometer, the method comprising the steps of:

rotating the shaft under relatively low load conditions and obtaining a first set of signals from the speed sensor corresponding to the angular rotation of the shaft and a second set of signals from the pyrometer representing the temperature of each blade turbine disk as each blade passes a predetermined point adjacent the pyrometer;

conditioning the first and second sets of signals to develop corresponding first and second sets of pulse signals in which each pulse signal in the first set of pulse signals has a determinable first phase relationship to each pulse signal in the second set of pulse signals;

operating the engine under at least another relatively higher load condition and obtaining another first set of signals from the speed sensor and another second set of signals from the pyrometer;

conditioning the another first and second sets of signals to develop another corresponding set of pulse signals;

determining another phase relationship between at least one pulse developed from the another first set of signals and at least one pulse developed from the another second set of signals;

comparing the first phase relationship to the another phase relationship and obtaining a difference therebetween;

determining the degree of twist in the engine shaft corresponding to the obtained phase relationship difference; and converting engine shaft twist to a corresponding torque value which will induce such twist for determining the power output of the engine from predetermined relationships between torque and power.

2. The method as set forth in claim 1 wherein the pyrometer provides an amplitude modulated signal, the steps of conditioning including the steps of converting the amplitude modulated signal to a train of pulse signals in which each pulse signal corresponds to a peak in the amplitude modulated signal.

3. Torque measuring apparatus for measuring the torque developed by a gas turbine engine having at least one shaft extending therethrough and at least one multi-blade turbine disk coupled thereto, the apparatus including:

a speed sensor mounted in the engine adjacent a forward end of the shaft, the speed sensor providing a first set of signals representative of angular rotation of the shaft;

a pyrometer mounted in the engine adjacent the at least one turbine disk, the pyrometer providing a second set of signals representative of the temperature of each turbine blade as each blade passes by the pyrometer;

pulse shaping means connected for receiving the first and second sets of signals and for generating therefrom a first and second set of pulse signals corresponding, respectively, to preselected angular increments of rotation of the forward end of the shaft and to passage of each turbine blade by the pyrometer;

means for determining a phase difference between selected ones of the first pulse signals and selected ones of the second pulse signals; and means responsive to said phase difference for determining the torque generated on the shaft.

4. The torque measuring apparatus of claim 3 and including a multi-tooth wheel coupled to the shaft adjacent said speed sensor whereby said first set of signals is representative of passage of each tooth by the speed sensor.

5. The torque measuring apparatus of claim 4 wherein the number of teeth on the multi-tooth wheel is an integer multiple of the number of blades on the turbine disk.

6. The torque measuring apparatus of claim 3 wherein said means responsive to said phase difference comprises means for storing phase difference data at a preselected engine torque output and means for comparing phase difference data at a different torque output to said stored difference data for determining engine torque at said different torque output.

* * * * *